United States Patent [19]

Brennan

[11] Patent Number: 5,587,740
[45] Date of Patent: Dec. 24, 1996

[54] DIGITAL PHOTO KIOSK

[76] Inventor: James M. Brennan, 3054 N. Downer Ave., Milwaukee, Wis. 53211

[21] Appl. No.: 516,273

[22] Filed: Aug. 17, 1995

[51] Int. Cl.$^6$ ............................................. H04N 5/225
[52] U.S. Cl. .................... 348/373; 348/143; 348/239; 396/429; 396/419; 396/3
[58] Field of Search ................ 348/61, 135, 143, 348/207, 222, 239, 335, 373, 374, 375; 354/75, 76, 81, 291; 364/400, 401, 586; H04N 5/225

[56] References Cited

U.S. PATENT DOCUMENTS

| | | | |
|---|---|---|---|
| 4,755,881 | 7/1988 | Bartlett | 358/254 |
| 5,017,953 | 5/1991 | Biondo, Jr. | 354/83 |
| 5,210,603 | 5/1993 | Sabin | 358/93 |
| 5,262,815 | 11/1993 | Aumiller | 354/290 |
| 5,289,280 | 2/1994 | Nomura et al. | 348/571 |
| 5,343,386 | 8/1994 | Barber | 364/400 |
| 5,345,313 | 9/1994 | Blank | 348/598 |
| 5,459,819 | 10/1995 | Watkins et al. | 395/117 |

*Primary Examiner*—Wendy Garber
*Assistant Examiner*—Ngoc-Yen Vu
*Attorney, Agent, or Firm*—Quarles & Brady

[57] ABSTRACT

A kiosk providing postcards at scenic attractions that includes a digital camera fixed to the housing in predetermined orientation with respect to the scenic attraction to provide an artistically composed image of that attraction that may be printed on a postcard after payment by a user. A marker plate and display allow a user to superimpose himself or herself within the image and to review that composition prior to creating and paying for the postcard.

4 Claims, 4 Drawing Sheets

DIGITAL PHOTO KIOSK

FIELD OF THE INVENTION

The present invention relates generally to vending machines and, in particular, to vending machines providing photographic postcards.

BACKGROUND OF THE INVENTION

Recreational travelers often wish to have a photographic record not only of the places they visit but also of themselves at those places. Such photographs may be later shared with friends or kept to serve as a memory of the trip. For this reason, many travelers bring a camera along on their trip to take pictures of the various sights.

For some this approach is unsatisfactory. They may not own a camera or they may wish to avoid the inconvenience of carrying it around. Some travelers forget to bring their cameras or are uncertain about their ability to obtain pictures of high quality or composition. For the traveller to be included in the image, he or she must impose on a bystander or employ complex and bulky accessories such as timers and tripods.

These problems are solved, in part, by professionally prepared photographs which capture well composed images of particular scenic attractions. Typically, such photographs are in postcard format to be directly mailed through the U.S. mail system at a reduced rate.

Nevertheless, postcards are not an entirely satisfactory substitute for personal photographs in that the traveler is not in the picture.

SUMMARY OF THE INVENTION

The present invention combines the advantages of a postcard (providing a high quality image, designed to be sent through the mail) with the personal nature of a photograph. In the invention, a digital camera contained within a kiosk is pre-oriented to the scenic attraction. For a fee, the traveller receives a postcard of the scenic attraction including, if desired, the traveller standing before the scenic attraction.

Specifically, the kiosk has a housing with a front panel having an aperture. It is anchored to the ground in such a way that its front panel faces the scenic attraction. A payment receiver affixed to the housing provides a payment signal registering a payment by the user. An electronic digital camera, also affixed to the housing, receives an image of the scenic attraction through the aperture and produces an electronic image signal. An electronic computer, including computer memory, receives the electronic signal from the electronic camera and stores it in computer memory. After receiving a payment signal, the electronic computer, operating according to a stored program, controls an electronic printer to print out a postcard depicting the scenic attraction.

Thus it is one object of the invention to provide the traveller with photographs of a scenic vista or the like, accurately portraying the images seen by the traveller.

The kiosk may also include a marker plate positioned at a predetermined position with respect to the electronic camera and away from the front panel to indicate the range of the electronic camera whereby individuals may place images of themselves in the postcard by standing at the location demarcated by the marker plate.

Thus, it is another object of the invention to provide a system that allows users to obtain images of themselves together with the areas they visit. The marker plate encourages correct composition of the image with the people in the foreground.

The kiosk may include a motorized cover positioned over the aperture and connected to the electronic computer wherein the electronic computer operates to open the motorized cover only after a payment signal has been received. The cover may be clear, and the kiosk may include an acceleration sensitive switch, producing a tamper signal and causing the electronic computer to store images taken through the cover if the tamper signal is received.

Thus, it is yet another object of the invention to provide the benefits of the above kiosk system while protecting the equipment inside the kiosk from vandalism. Access to the lens of the camera is prevented except after payment and, prior to payment, the camera may obtain images of possible vandals.

The kiosk may include a display screen communicating with the computer to display images from the electronic image signals. A user input communicating with the electronic computer provides a confirmation signal, and the electronic computer causes the printing of the postcard only after a displayed image is specifically selected by the user. Multiple displayed images may be stored, allowing the purchaser to select among them. Prior to selection, the user may cancel the transaction and receive a refund.

The computer memory may hold a template of the scenic attraction and may be programmed to compare that template to the electronic signals received from the electronic camera. If less than a threshold degree of correlation between the template and the electronic image is received (e.g., if gum or mud obscures the lens), the kiosk may indicate to the user a failure, thus preventing the user from unnecessarily spending money.

Thus it is another object of the invention to significantly reduce the possibility of the traveller being charged for unsatisfactory images.

The electronic image signals may be examined by the computer to see if people are standing within the field of view of the scenic image. If so, images may be taken and displayed on the display screen.

Thus, it is another object of the invention to use the kiosk system to advertise its abilities by taking randomly composed pictures of people and the scenic view, displaying the image for possible sale.

The foregoing and other objects and advantages of the invention will appear from the following description. In the description, reference is made to the accompanying drawings which form a part hereof and in which there is shown, by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
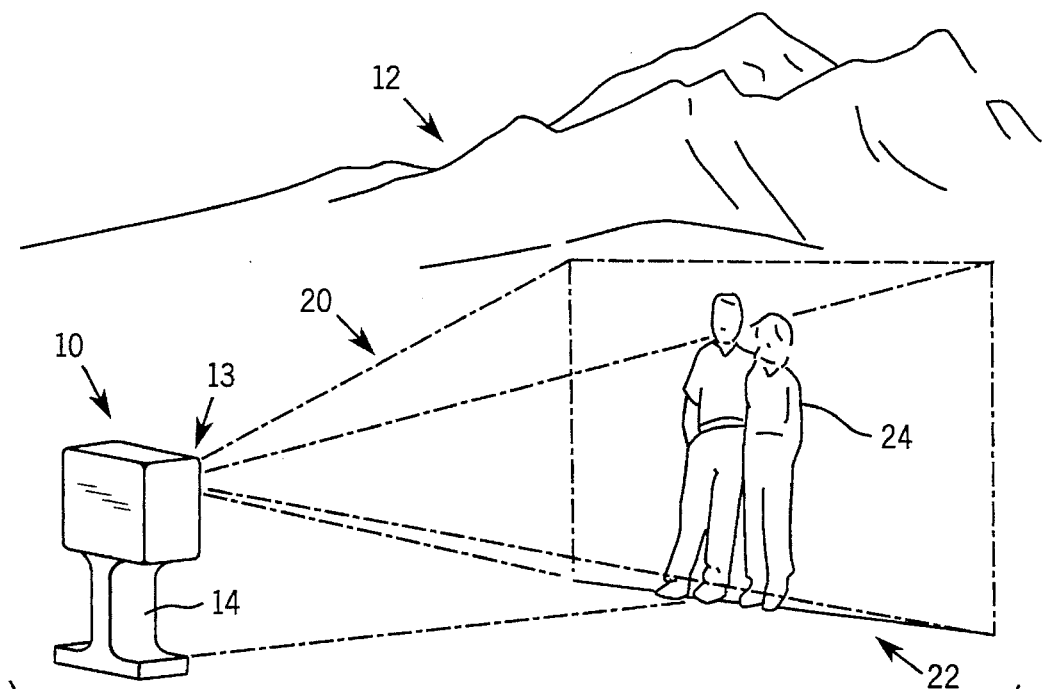
FIG. 1 is a perspective view of the kiosk of the present invention having a camera positioned with respect to a scenic view and a marker plate used by individuals to place themselves within the field of view of the camera.

Referring now to FIG. 1, a kiosk 10 may be positioned near a scenic attraction 12 with a front panel 13 facing the scenic attraction 12, the front panel 13 anchored at a predetermined orientation with respect to scenic attraction 12 by stand 14 supporting the kiosk 10 on the ground.

Figure 2:
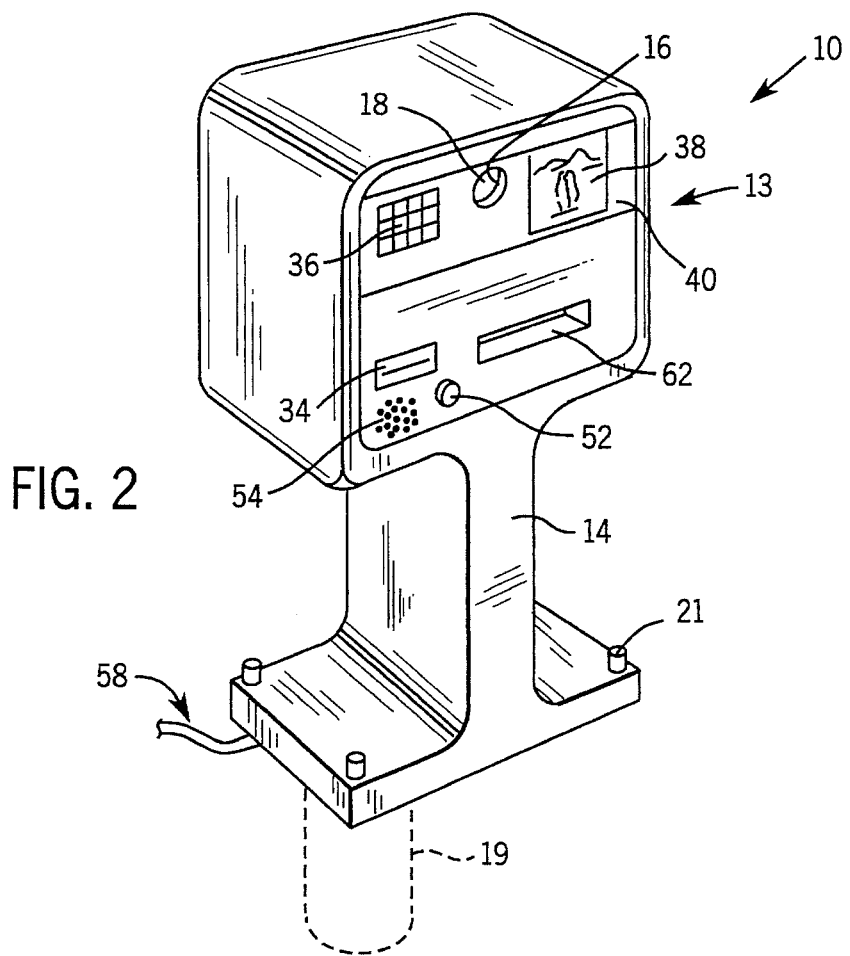
FIG. 2 is a perspective view of the front of the kiosk showing the aperture through which the camera receives images as covered by a clear protective panel.

Referring also to FIG. 2, the front panel 13 of the kiosk 10 includes an aperture 16 through which a camera lens 18 may receive light from a field of view 20 (visible in FIG. 1). A marker plate 22 is affixed to the ground at a fixed distance from, and in a predetermined orientation with respect to the kiosk 10 and within the field of view 20, provides a visual aid in the positioning of people 24 within the field of view 20 in front of the scenic attraction 12. The marker plate 22 indicates both the range and center of the field of view 20, and the focal distance of the lens 18 so that people 24 standing at the marker plate 22 will be in focus in an image produced by lens 18 to be described.

The orientation of the kiosk 10 and the positioning of the marker plate 22 are selected so that an image of the field of view 20 having people 24 at the marker plate 22 provides an attractive pictorial composition.

A buried telephone/power line 58 connects the kiosk to a local source of power and telephone connections. Kiosk 10 may be anchored to the ground by means of cement pilings 19 attached to the stand 14 by one or more anchor bolts 21.

Figure 3:
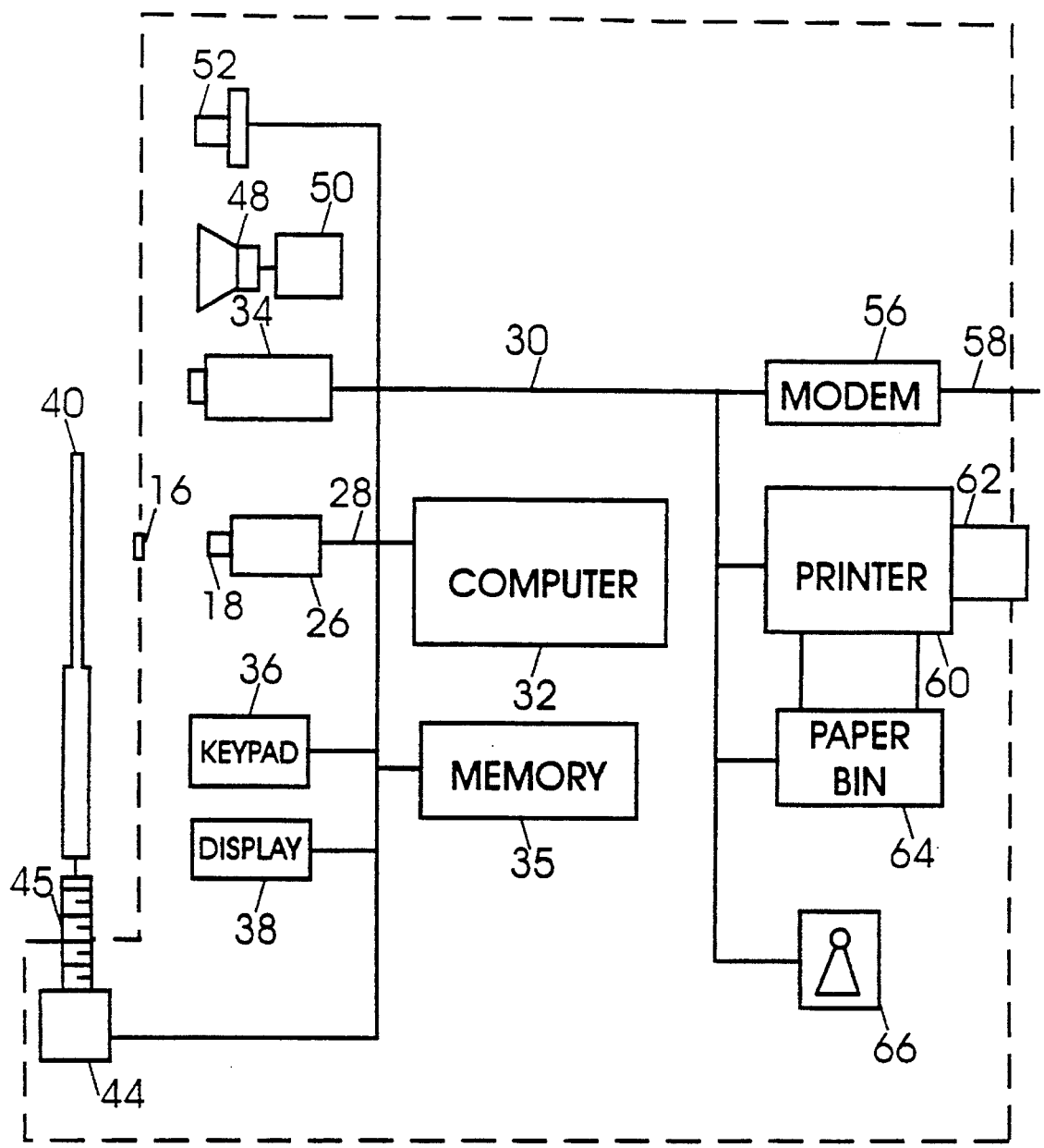
FIG. 3 is a schematic diagram of the various components of the kiosk of FIG. 2 showing the computer as connected to the camera for receiving image signals therefrom.

Referring now to FIGS. 2 and 3, the lens 18 positioned behind the aperture 16 is part of a digital camera 26 employing a charge coupled device such as are well known in the art. The digital camera produces electronic image data 28 representing an image of the field of view 20 as an array of values providing color and brightness of pixels in the image. As stored in memory, each pixel of an image occupies a memory location having an address in memory related to its location within the area of the image. Thus both location and pixel value are defined.

The electronic image data 28 may be transmitted along an electrical bus 30 connected to a computer 32.

The bus 30 also connects the computer 32 to computer memory 35 in which the image data 28 may be stored together with other image data, each as a separate array of numbers according to methods well known in the art. The computer memory 35 also holds a stored operating program used by the computer 32 in controlling the various elements of the kiosk 10 as will be described.

A keypad 36 and a flat panel color display 38 are also presented at the front panel 13, the keypad being a conventional alphanumeric keypad with multiplexed switch elements and the display being an LCD flat panel display both of which are widely commercially available. Both the keypad 36 and the display 38 are connected to the bus 30 to provide data inputs to the computer 32 and to receive image data 28 from the memory 35 under the control of computer 32 for display to the user.

The bus 30 also connects the computer 32 to a card reader 34 having an opening for receiving credit cards or the like through the front panel 13. The card reader 34 provides credit card billing data through the bus 30 to the computer 32 in the form of a payment signal indicating the user has offered payment for a postcard.

A speaker 48 driven by a waveform synthesizer 50 is also connected to bus 30 so that the computer 32 may generate tones and spoken commands to the user, the latter being based on stored waveforms contained in memory 35. The speaker communicates through the front panel 13 through a grill 54 visible in FIG. 2.

A start button 52 supplements the keypad 36 in providing a method for the user to communicate with the computer 32 not protected behind clear panel 40 (to be described) during a resting state. The start button 52 is also connected to the bus 30 to be monitored by the computer 32. In one mode, the start button may be activated by a user to display an image of the user prior to receipt of a payment signal.

Also connected to bus 30 is modem 56 communicating with the telephone/power line 58 as may be used to provide credit card billing information to a remote billing center and to notify a service provided that service of the kiosk is required, as will be described.

A color printer 60 is also connected to bus 30 to receive image data 28 from memory 35 under the control of computer 32 to print images on postcard size stock and deliver them to slot 62 in the front panel 13. Associated with printer 60 is a paper bin 64 which contains postcard size stock preprinted on the non-image side to provide indicia for placement of the stamp and addressing the card as well as space for including a message. The paper bin 64 includes sensors for determining the remaining cardstock in paper bin 64 and for providing signals to computer 32 via bus 30 if cardstock drops below a predetermined amount.

A tilt switch 66 is also connected to bus 30 to be monitored by computer 32. As is understood in the art, the tilt switch provides an indication that the kiosk 10 has been tipped or physically jarred such as may occur during vandalization of the same. The tilt switch 66 may be a pendulum type device in which the pendulum closes a pair of contacts or a mercury switch.

The bus 30 provides both data lines for communicating data (such as image data 28) and address lines for designating the particular device on the bus 30 that is providing or receiving the data. The computer 32 controls data flow on the bus 30 treating each of the other elements connected to the bus as memory mapped I/O as is well understood in the art. At certain memory addresses, the computer 32 may read and write from memory 35 whereas at other memory addresses, the computer 32 may read or write from the other elements connected to the bus 30 such as the keypad 36, the display 38 or the modem 56. Each of the elements connected to the bus 30 includes well known bus interface circuitry for detecting the element's address as transmitted on the bus 30 by the computer 32 and for placing data on the bus 30 in a manner that conforms with the bus protocol.

A clear panel 40 covers the aperture 16 (and hence the lens 18) as well as the keypad 36 and the display 38 during a resting state of the kiosk 10 prior to receipt of a payment signal from the card reader 34. The clear panel 40 may be composed of a tough but optically transparent material such as Lexan.

Under the control of computer 32, a motor 44 also attached to the bus 30 retracts the clear panel 40 into a slot into the front panel 13 of the kiosk 10 to fully expose the keypad 36, the display 38 and the lens 18 of the camera. Because the panel 40 is clear, the camera 26 may still provide images when the clear panel 40 is closed in the resting state.

Figure 5:
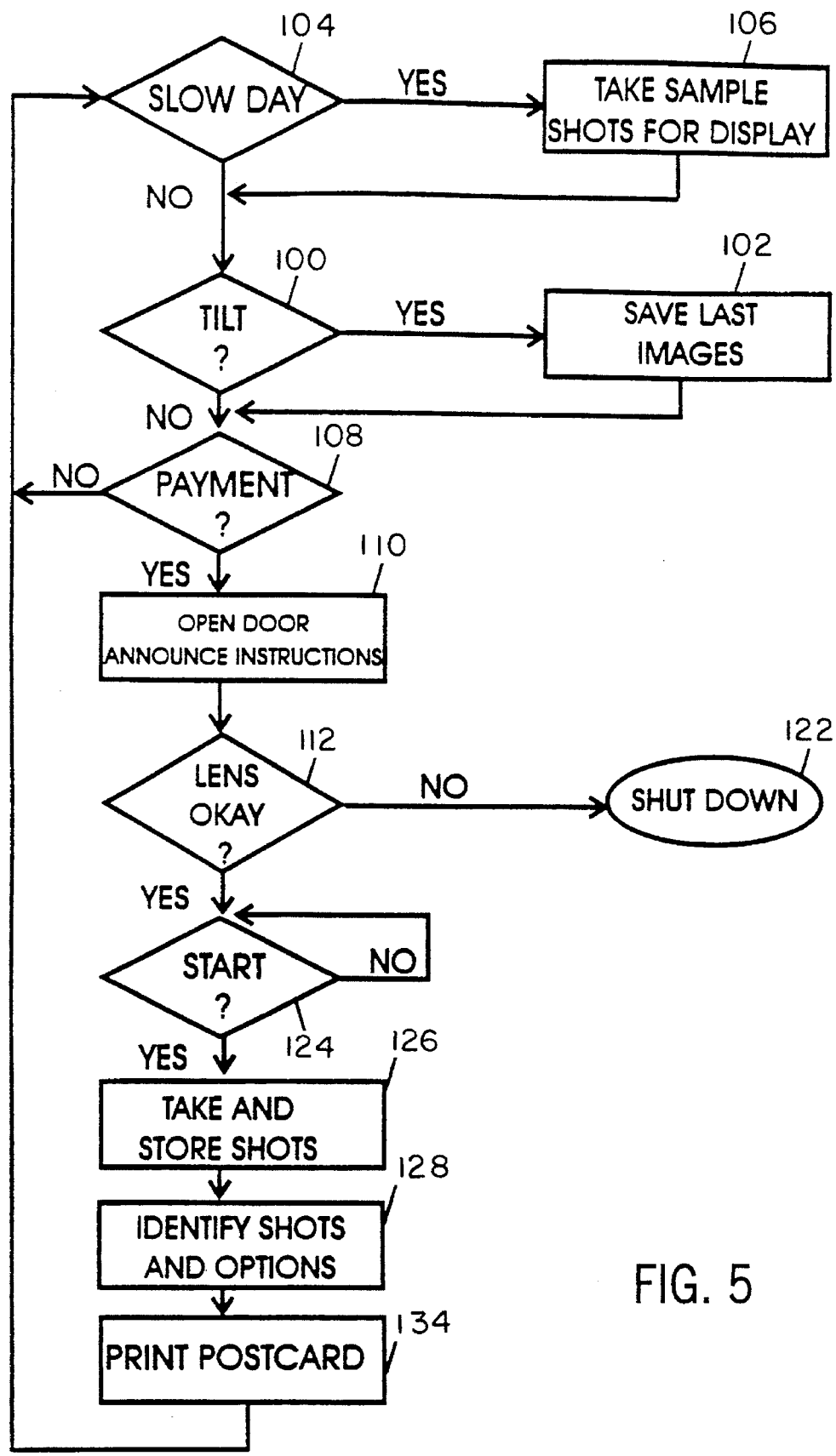
FIG. 5 is a flow chart of the operation of the computer of FIG. 3 according to a stored program.

Referring now to FIG. 5, the computer 32 operates according to a stored program contained in memory 35 to control the various elements connected to the bus 30 so as to operate the kiosk 10. The program is executed in a continuous loop while the kiosk is activated. During this loop image, image data 28 is periodically acquired from the camera 26 for diagnostic and other purposes as will be described.

The kiosk 10 is initially in the rest state with the clear panel 40 covering the lens 18. In this state, the computer 32 causes the acquisition of fresh image data 28 from the camera 26 at decision 104 and checks to see when the last postcard was purchased. It also reviews a set of image data 28 previously obtained from the camera 26 to determine whether there is activity, such as people moving in front of the field of view 20. If there is activity and a postcard has not been purchased within a predetermined time determined by the operator of the kiosk 10, the computer 32 causes one or more sets of image data 28 to be displayed on the display 38 and announces this fact to passersby via speaker 48 offering to sell a postcard of those images to the passersby, as indicated by process block 106.

Figure 4:
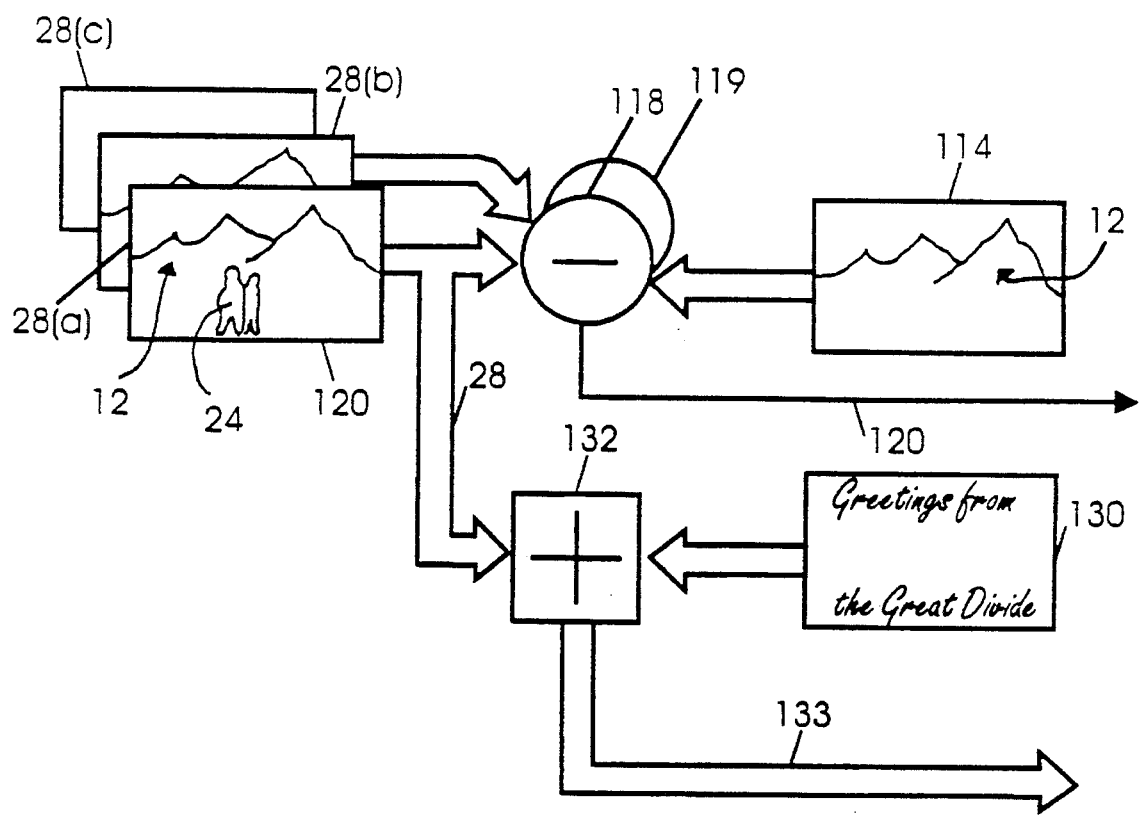
FIG. 4 is a diagrammatic illustration of the processing of image signals received from the camera by the computer such as verifies operation of the camera and adds printing or other matter to the image.

Referring also to FIG. 4, the repeated execution of process block 104 results in a sequence of image data 28 stored in memory 35. The last three such images 28(*a*), 28(*b*) and 28(*c*) may be compared by summing the square of the differences between the values of the pixels, through comparison routine 118 executed by computer 32, to produce a difference value 120. A comparison may be also made between the current image 28(*a*) and a template image 114, the latter providing an indication of the scenic attraction 12 without people superimposed on it, to produce a second difference value 120. If the first difference value is below a predetermined threshold, it may be assumed that the image shows no motion. If the second difference value is above a predetermined threshold, it may be assumed that the image has people in it. These two indications together trigger process block 106 if a postcard has not been recently purchased.

Referring next to decision block 100 of FIG. 5, the computer 32 interrogates the tilt switch 66 to see if the kiosk 10 has been jarred. This is a second "background" task of the computer 32 intended to detect possible vandalism or mistreatment of the kiosk 10. If a tilting of the kiosk 10 has occurred as indicated by the tilt switch 66, at process block 102 recently acquired images 28(*a*)–(*c*) from the camera 26 stored in memory 35 are saved by moving the images from a buffer area in memory 35 to an archival area in memory 35. Next, computer 32 dials out an alarm signal via modem 56 on telephone line 58 and generates a siren tone to speak 48 via waveform synthesizer 50.

At decision block 108, if there has been no payment by a user indicated by the absence of a payment signals from the card reader 34, the program loops to decision blocks 104 and 100, regularly obtaining images of the field of view 20 and storing them in memory 35. On the other hand, when a passerby inserts a credit card into card reader 34 and a payment signal is transmitted along bus 30 to the computer 32, then at process block 108, the program does not loop to the top of decision block 104 but instead passes to the top of process block 110 at which time the computer 32 activates motor 44 drawing clear panel 40 downward away from the aperture 16 and allowing the user access to the keypad 36 and display 38. The potential for vandalism is significantly reduced if access to the more sensitive components of the kiosk 10 is limited prior to the making of a payment through card reader 34. The payment signal only indicates the insertion of the card in the card reader 34 and the reading of proper credit card information from the card such as may form the basis of a charge to that credit card. An actual charge is not entered at this time.

After opening the clear panel 40, at process block 110, the user is instructed in the operation of the kiosk via the speaker 48 through a set of recorded instructions contained in memory 35. The user is instructed to push the start button 52 and then to position him or herself at the marker plate 22 prior to the termination of an audio countdown through speaker 48.

Next at decision block 112, with the clear panel 40 removed from in front of the lens, the lens is checked by comparing the last lens check image obtained at process block 106 with a template stored in memory and representing the scenic attraction 12 without people 24. Referring also to FIG. 4, the template image 114 is compared by correlation routine 119 with the now current image 28(*a*) to determine if the correlation between the two images is within a range indicating that the kiosk 10 is still properly aligned with the scenic attraction 12. The spatial frequency content of the image 28(*a*) is also compared to that of the template image 114 to detect an obstruction on the lens 18 such as would cause a blurring of the image 28(*a*) and a lower spatial frequency content. At process block 112, total brightness of the image may also be analyzed by summing the pixel values and divided by the number of pixels so as to determine whether a properly exposed image may be obtained.

If these evaluations performed by the correlation routine 119 are not within the desired range at process block 112, the computer 32 concludes that the lens 18 is obstructed or damaged and/or the kiosk 10 has been moved, and shuts down after refunding the money of the user and reporting the problem both to the user and over the phone lines 58.

Assuming that the lens 18 and kiosk 10 are operable at decision block 112, the computer 32 awaits the pressing of the start button 52 by the user, indicating that the user wishes images to be acquired. When the start button is pressed as indicated by decision block 124, then at process block 126, the computer 32 acquires a set of six images spaced in time and preceded by a tone from speaker 48, the images being stored in memory 35 and displayed in thumbnail form on display 38.

At process block 128, the user is then instructed to identify one or more shots which the user wishes to turn into postcards. Certain options are permitted, including cropping the photograph, limited enlargement and superscription of a text message. Referring also to FIG. 4 for this latter operation, the user is presented with one or more text images 130 on display 38. Each text image 130 is image data 28 in memory 35 which may be superimposed on the image data 28(*a*) taken by the camera 26. This superscription is performed by computer 32 comparing each pixel of the two images 28(*a*) and 130. The text image 130 includes a background portion indicated by pixels having value 0 and a lettering portion indicated by pixels having the value 1. The addition program 132 compares each corresponding pixel of the image data 28 and the text image 130 and if the text image 130 is a zero, forwards the pixel from the image data 28' to form the composite image 133. On the other hand, if the lettering image is a one, the adder 132 forwards the lettering image value (or another color selected by the user) to the composite image 133. The composite image 133 is then displayed.

Referring again to FIG. 5, once options and shots have been identified at process block 128, at decision block 134, the paper bin 64 is interrogated to insure sufficient postcards remain for foreseeable demand and, if not, a message is transmitted over modem 56 and telephone line 58 indicating that a service call will be required shortly. If cardstock is in bin 64, then the computer 32 instructs the printer to print the identified image 28(*a*) or 133 at process block 134.

Printed postcards containing the selected image are deposited in slot 62 to be removed by the user. An appropriate charge to the user's credit card is made by a modem 56 over telephone line 58. At the conclusion of printing the postcard, the program returns to process block 104 to repeat the above described processes.

The above description has been that of a preferred embodiment of the present invention. It will occur to those that practice the art that many modifications may be made without departing from the spirit and scope of the invention. For example, the kiosk 10 need not be anchored to a single position but by means of detents may be rotated to one or more fixed positions with respect to an anchoring point such as represent predetermined compositionally correct fields of view 20. Clearly the kiosk may accept paper money or coins instead of credit or debit cards.

To apprise the public of the various embodiments that may fall within the scope of the invention, the following claims are made.

I claim:

1. A kiosk providing postcards of a scenic attraction comprising:

an enclosed housing having a front panel with an aperture;

an anchor affixing the housing to the ground with the front panel facing the scenic attraction;

a payment receiver affixed to the housing to provide a payment signal indicating a payment by a user;

an electronic camera affixed within the housing to receive an image of the scenic attraction through the aperture to produce electronic image signals;

an electronic printer receiving electronic image signals and producing a printed postcard depicting the image;

an electronic computer including computer memory receiving the electronic image signals from the electronic camera and storing them in computer memory and after receiving the payment signal, operating according to a stored program to control the electronic printer to print the postcard depicting the scenic attraction;

a clear motorized cover positioned over the aperture and connected to the electronic computer wherein the electronic computer operates to open the motorized cover only after the payment signal has been received; and an acceleration sensitive switch producing a tamper signal and wherein the electronic computer operates according to the stored program to store images taken through the cover if the tamper signal is received.

2. The kiosk of claim 1 wherein the kiosk stores the electronic image signals from the electronic camera in the computer memory and displays the same at periodic intervals if the electronic image signals indicate people posing in front of the scenic attraction.

3. A kiosk providing postcards of a scenic attraction comprising:

an enclosed housing having a front panel with an aperture;

an anchor affixing the housing to the ground with the front panel facing the scenic attraction;

a payment receiver affixed to the housing to provide a payment signal indicating a payment by a user;

an electronic camera affixed within the housing to receive an image of the scenic attraction through the aperture to produce electronic image signals;

an electronic printer receiving electronic image signals and producing a printed postcard depicting the image;

an electronic computer including computer memory receiving the electronic image signals from the electronic camera and storing them in computer memory and after receiving the payment signal, operating according to a stored program to control the electronic printer to print the postcard depicting the scenic attraction;

wherein the computer memory holds a template of the scenic attraction in memory and wherein the electronic computer is programmed to monitor the electronic signals received from the electronic camera to provide a correlation signal between the electronic signals and the template.

4. The kiosk of claim 3 wherein the kiosk indicates to the user a failure if the correlation signal indicates less than a threshold degree of correlation between the template and the electronic image such as might be caused by an obstruction of the lens.

\* \* \* \* \*